United States Patent [19]

Yuda

[11] 4,393,561
[45] Jul. 19, 1983

[54] RADIATOR GRILLE FIXING STRUCTURE

[75] Inventor: Takuo Yuda, Yokohama, Japan

[73] Assignee: Nifco, Inc., Yokahama, Japan

[21] Appl. No.: 164,506

[22] Filed: Jul. 2, 1980

[30] Foreign Application Priority Data

Jul. 5, 1979 [JP] Japan ............................. 54-91897[U]

[51] Int. Cl.³ ............................................. E04B 1/38
[52] U.S. Cl. ........................................ 24/297; 24/214;
24/305; 411/508; 52/507; 52/511
[58] Field of Search ..................... 24/213 R, 214, 305,
24/336, 297; 411/508, 509, 510; 403/406, 407,
408; 52/507, 511

[56] References Cited

U.S. PATENT DOCUMENTS

| | | | |
|---|---|---|---|
| 3,393,431 | 7/1968 | Saunders | 411/508 |
| 3,577,608 | 5/1971 | Texler | 24/214 |
| 3,704,486 | 12/1972 | Blacklock | 411/508 |
| 3,842,565 | 10/1974 | Brown et al. | 24/297 X |
| 4,114,339 | 9/1978 | Ito | 24/214 X |
| 4,261,151 | 4/1981 | Ito | 52/507 |
| 4,287,657 | 9/1981 | Andre et al. | 24/213 R X |

FOREIGN PATENT DOCUMENTS 1949238  4/1970  Fed. Rep. of Germany ...... 411/509

*Primary Examiner*—Thomas J. Holko
*Attorney, Agent, or Firm*—Trexler, Bushnell & Wolters, Ltd.

[57] ABSTRACT

A fastener constituting an essential part of a fixing structure for fastening a radiator grille to an automobile body is provided on one side of the base plate portion thereof with fastening means for engagement with the automobile body and on the other side of the base plate portion with fastening means for engagement with the radiator grille and additionally with a rib in a position surrounding the radiator grille fastening means which rib is tightly accommodated into a recess formed in the radiator grille fastening portion. This arrangement gives the fastener enhanced resistance to various forms of stress that may be exerted on the radiator grille in use.

3 Claims, 6 Drawing Figures

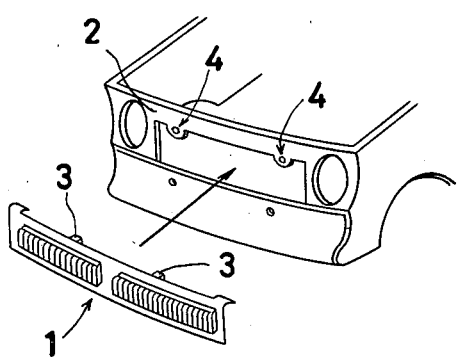
Fig_1
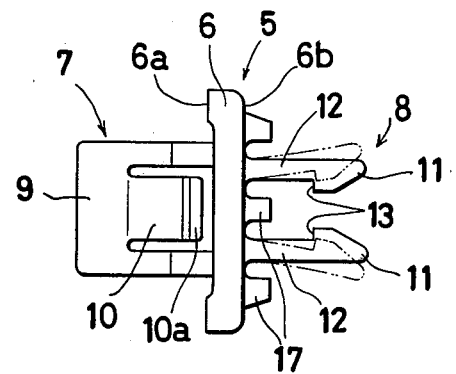
Fig_2(A)
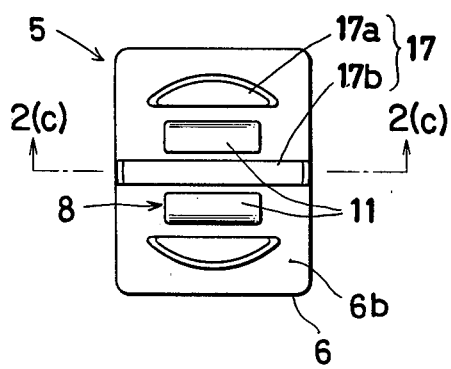
Fig_2(B)
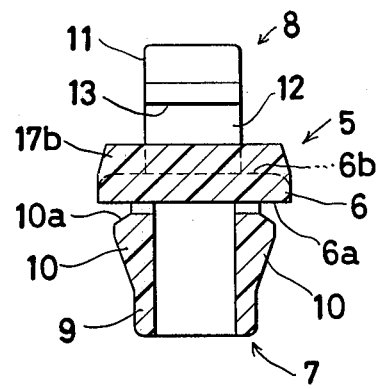
Fig_2(C)
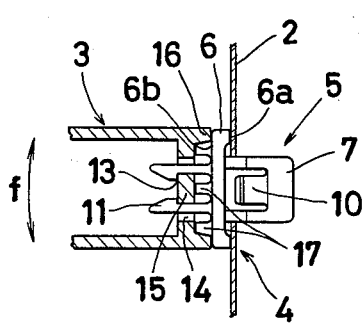
Fig_3
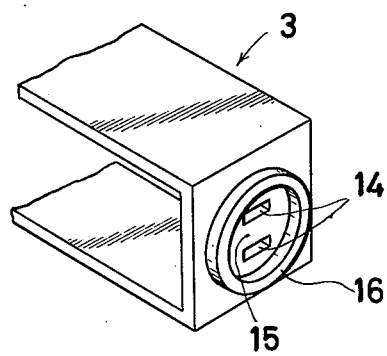
Fig_4

RADIATOR GRILLE FIXING STRUCTURE

BACKGROUND OF THE INVENTION

This invention relates to a fixing structure for fastening an automobile radiator grille to an automobile body.

Automobile radiator grilles in use nowadays are preponderantly made of plastics. When such plastic radiator grilles are fastened to automobile bodies with plastic fasteners, the shearing stress and torsional stress which develop between the fasteners and the radiator grilles are not satisfactorily absorbed. The widely adopted conventional fixing fasteners for fastening a radiator grille to an automobile body are, for example, provided with two pairs of engaging legs such as hooks or anchors projecting in the opposite directions. They bring the automobile body and the radiator grille into fast union by causing the engaging legs thereof to be inserted into openings of matched size formed in the engaging means of the automobile body and the radiator grille. While fasteners of this construction exhibit relatively strong resistance to tensile forces and other similar forces, they offer weak resistance to the shearing stress and torsional stress which tend to develop in the engaging legs of the individual fasteners under the influence of vibration, impact and unexpected external forces. These fasteners, therefore are often found to break under such forms of stress.

SUMMARY OF THE DISCLOSURE

An object of this invention, therefore, is to provide a fixing structure which offers strong resistance to the forms of stress due to vibration, impact and other similar external forces, and ensure fast union of the automobile body and the radiator grille with high reliability.

To accomplish the object described above according to the present invention, there is provided a fixing structure for fastening a radiator grille to an automobile body, which comprises a fastener which is provided, on one side of the base plate portion thereof, with automobile body engaging means adapted to snap into fast engagement with the fastening means of the automobile body, on the other side of the base plate portion, with radiator grille engaging means adapted to enter into fast engagement with the fastening means on the radiator grille and, around the radiator grille engaging means, with ribs; and an opening formed in the radiator grille for the purpose of admitting the radiator grille engaging means of the fastener and fastening means provided with a stepped portion for the purpose of admitting the ribs of the fastener into tight union therewith.

The radiator grille is not solely held fast by the engaging means of the fastener but is supplementarily supported in position by the ribs of the fastener rigidly engaging with the stepped portion of the fastening means of the radiator grille. The union formed by the fixing structure between the radiator grille and the automobile body, therefore, exhibits high resistance to the shearing stress and torsional stress exerted particularly on the engaging means of the fastener owing to loads applied to the radiator grille. The fastener and the fastening means formed on the radiator grille and the automobile body constitute a safe radiator grille fixing structure which assures high stability of the engagement.

The other objects and features of this invention will become apparent from the further disclosure to be made hereinafter with reference to the accompanying drawings.

BRIEF EXPLANATION OF THE DRAWING

FIG. 1 is a perspective view of typical positions for the application of the embodiment of this invention.

FIG. 2(A) is a side view of a typical fastener as a constituent part of the fixing structure of this invention.

FIG. 2(B) is a plan view of the same fastener.

FIG. 2(C) is a sectioned view taken along the line 2(C)—2(C) of the plan view of FIG. 2B.

FIG. 3 is a sectioned view of the essential part of the fixing structure according to this invention.

FIG. 4 is a perspective view of a typical fastening means in the radiator grille as a constituent part of the fixing structure of the invention.

DESCRIPTION OF THE PREFERRED EMBODIMENT

This invention relates to a fixing structure for fastening a radiator grille to an automobile body. The fixing structure aims not merely to fasten the radiator grille to the automobile body but also to add to the resistance offered by the radiator grille to various forms of stress due to vibration, impacts and other similar external forces exerted thereon.

As shown in FIG. 1, the position to which the embodiment of this invention is applied is between the radiator grille 1 and the front portion 2 of the automobile body. To be more specific, the position is between the attachment point 3 on the radiator grille and the corresponding attachment point 4 on the automobile body. Namely, a fastener 5 of the construction illustrated in the drawings of FIG. 2 is fastened to the opposed surfaces of the radiator grille and the automobile body.

The fastener 5 is wholly molded of a plastic material and is provided, on the opposite sides of the central base plate portion 6 thereof, with fastening means 7 for snap engagement with the automobile body and fastening means 8 for snap engagement with the radiator grille.

These structure of the fastening means 7, 8 for snap engagement may be any of the conventional means such as of anchor type, canoe type and hook type which have heretofore been utilized for the purpose of providing effective use of plastic fasteners between the two objects being fastened. By way of example, it is assumed herein that an anchor type of fastening means is used on the automobile body side and a pair of hook type fastening means are used on the radiator grille side. The fastening means 7 for snap engagement with the automobile body has a squarish U-shaped hole punched through a leg portion 9 extended from the central base plate portion 6 thereof with the letter U symmetrical relative to the lateral sides of the leg portion, whereby the fastening attachment point 4 of the automobile body is inserted and pinched between the protruding portion 10a of the catch piece and one surface 6a of the central base plate portion.

This fastener enables the union between the radiator grille and the automobile body to be attained in the same way as the anchor type fastener of the same category; specifically by causing the catch piece 10 to be passed through the opening formed in the fastening attachment point 4 of the automobile body barely wide enough for the passage of the leg portion 9 with the catch piece 10 bent inwardly relative to the leg portion 9 by virtue of the squarish U-shaped hole and, after the protruding portion 10a has slid past the edge of the hole, enabling the catch piece to resume its original state thereby having the fastening attachment point 4 of the automobile body pinched between the protruding portion 10a of the catch piece and the base plate surface 6a.

On the other hand, the fastening means 8 for snap engagement with the radiator grille is composed of a pair of hooks 11 which rise via the leg portions 12 from the other surface 6b of the central base plate portion. The hooks 11 are provided on their respectively opposed surfaces with engaging jaws 13. These hooks 11 are capable of being bent in the mutually separating directions.

The attachment point 3 on the radiator grille 1 side is provided with openings 14 for admitting the aforementioned hooks 11 when the radiator grille 1 is poised against the front side of the automobile body (FIG. 4). Between the openings 14 is formed a crosspiece 15 which serves as engaging means. The width of this crosspiece 15 in the direction toward the two openings is nearly equal to the distance between the leg portions 12 below the engaging jaws of the hooks. When, as already described, the radiator grille is pushed toward the automobile body so as to thrust into the two openings 14 the corresponding hooks 11 of the fastener 5 which has been fastened in advance to the automobile body, therefore, the hooks 11 at first advance inside the openings while being bent in the mutually separating directions as indicated by the imaginary line in the drawing of FIG. 2A and, after the engaging jaws 13 have ridden over the crosspiece 15, resume their original shape by virtue of their own resilience and consequently fix the fastening attachment point 3 on the automobile body while wrapping themselves around the crosspiece 15 as illustrated in FIG. 3.

The hooks 11 may have their respective engaging jaws disposed outwardly. Optionally one such hook may be used instead of one pair of hooks. Otherwise, some other suitable engaging means mentioned previously may be used in the place of these hooks.

What does matter at this point, however, is the existence of the possibility that, after the fastening portion 3 on the radiator grille side has been fixed as described above, the torsional stress exerted such as on the radiator grille as indicated by the bent arrow in FIG. 3 will disengage the fastening portion from the hooks 11, for example, or cause breakage in the fastener or radiator grille. This invention is characterized by incorporating a special structure intended to solve this problem. This structure comprises a recess 16 of a suitable size which is formed in the surface of the fastening attachment point 3 of the radiator grille opposed to the fastener 5 and containing the openings 14 and a rib 17 which is formed on the surface 6b of the fastener opposed to the aforementioned surface containing the recess and is adapted to come into tight contact, on the lateral side thereof, with at least a part of the inner circumferential edge of the recess 16 in the fastening attachment point of the radiator grille.

In this preferred embodiment, the recess 16 in the fastening attachment point 3 of the radiator grille is formed in an annular shape as illustrated in FIG. 4, and the rib 17 on the fastener 5 comprises a rib 17a possessing an arcuate outer lateral surface coming into contact with the inner circumferential edge of the recess and a straight rib 17b whose opposite longitudinal ends alone come into contact with the aforementioned inner circumferential edge as illustrated in FIG. 2B. This rib may be formed in any other desired shape on condition that it is so constructed as to come into contact with the inner circumferential edge of the recess 16 in the fastening attachment point 3 of the radiator grille. In other words, the outer lateral surfaces of the component ribs 17a, 17b come into intimate contact with the inner circumferential edge of the recess in the fastening attachment point 3 as in the fixed state shown in FIG. 3. If there is exerted torsional stress in the direction of the arrow f indicated in the drawing, therefore, it is not allowed to have any effect on the hook. The fastener, accordingly, offers ample resistance to this stress.

Further, the lateral surfaces of the rib 17 concurrently serve to pinch the crosspiece 15 in cooperation with the engaging jaws 13 of the hook and contribute supplementarily to the fixing force produced by the fastener, bringing about high stability of the union between the radiator grille 1 and the automobile body 2. For the materialization of this effect, it is prerequisite that the distance between the engaging jaw 13 of the hook and the lateral surface of the rib 17 should be equalized to the thickness of the flat portion of the fastening attachment point 3 including the crosspiece 15. If there is no special need for this effect, then the height of the rib 17 may be slightly decreased.

In the embodiment described above, the recess 16 in the fastening attachment point 3 of the radiator grille 1 is formed in the shape of an annular ridge on the leading end surface of the fastening attachment point 3. It may otherwise be formed by simply giving a circular depression to the leading end surface. The shape of this depression neet not necessarily be circular. The important thing is that the overall outer boundary of the rib 17 formed on the fastener should conform to the shape of the recess 16 formed on the leading end surface of the fastening attachment point 3 of the radiator grille.

According to this invention, the fixing structure notably enhances not merely the fixing strength but also the resistance offered to the various forms of stress exerted by external forces upon the radiator grille after the union is formed and, therefore, is capable of bringing the radiator grille and the automobile body into a stable state of union.

What is claimed is:

1. A fixing structure for fastening a radiator grille to an automobile body, comprising in combination a fastener composed of a base plate portion, at least one automobile body fastening means formed on one side of said base plate portion and adapted for snap engagement with the automobile body, at least one radiator grille fastening means formed on the other side of the base plate portion and adapted for snap engagement with the radiator grille, and three ribs comprising a first rib disposed diametrically of said recess and a pair of ribs spaced on either side of said first rib, each of said pair of ribs having an arcuate outer lateral surface and positioned surrounding said radiator grille fastening means, and a fastening attachment point formed on the radiator grille and provided with an opening formed opposite the radiator grille fastening means of the fastener and adapted to admit into snap engagement therewith said radiator grille fastening means, said radiator grille fastening attachment point having an annular recess adapted to admit the rib of the fastener into intimate contact therewith.

2. The fixing structure for fastening a radiator grille to an automobile body according to claim 1, wherein the radiator grille fastening means is in the form of hooks provided with engaging jaws and the distance between said engaging jaw and the lateral surface of the rib formed on the base plate portion is equal to the thickness of the portion of the fastening attachment point of the radiator grille containing the opening.

3. A fixing structure as set forth in claim 1 wherein said recess is formed by an annular ridge projecting from said radiator grille fastening attachment point.

* * * * *